United States Patent [19]

Phillips

[11] Patent Number: 5,667,333
[45] Date of Patent: Sep. 16, 1997

[54] SHAFT-CARRIED SPEED REDUCER HAVING ADAPTABLE MOUNTING ARRANGEMENT

[75] Inventor: Allyn E. Phillips, Simpsonville, S.C.

[73] Assignee: Reliance Electric Industrial Company, Cleveland, Ohio

[21] Appl. No.: 491,359

[22] Filed: Jun. 30, 1995

[51] Int. Cl.⁶ ................................................. F16D 1/08
[52] U.S. Cl. ........................... 403/369; 403/3; 403/4; 403/360; 403/371; 474/903
[58] Field of Search ................. 403/3, 4, 360, 403/367, 368, 369, 370, 371, 375; 474/903

[56] References Cited

U.S. PATENT DOCUMENTS

| | | | |
|---|---|---|---|
| 1,655,734 | 1/1928 | McWilliams | 279/112 |
| 2,680,633 | 6/1954 | Brown | 403/369 |
| 2,816,452 | 12/1957 | McCloskey | 403/369 X |
| 2,889,161 | 6/1959 | Powell et al. | 474/903 X |
| 2,946,611 | 7/1960 | Moyer | 403/356 |
| 3,101,962 | 8/1963 | Nunlist | 403/368 |
| 3,373,626 | 3/1968 | Maurer et al. | 74/421 |
| 3,590,652 | 7/1971 | Strang | 74/421 |
| 3,653,691 | 4/1972 | Bram | 285/236 |
| 4,452,547 | 6/1984 | Thiel et al. | 403/370 |
| 4,626,114 | 12/1986 | Phillips | 384/584 |
| 4,630,690 | 12/1986 | Beasley | 175/57 |
| 4,884,916 | 12/1989 | Johnson, III | 403/370 |
| 4,906,125 | 3/1990 | Burstrom | 403/370 |
| 5,174,680 | 12/1992 | Nakamura et al. | 403/370 |
| 5,197,345 | 3/1993 | Rose | 74/421 R |
| 5,203,221 | 4/1993 | Logsdon | 74/421 R |

FOREIGN PATENT DOCUMENTS

| | | | |
|---|---|---|---|
| 272852 | 7/1965 | Australia | 403/369 |
| 7013424 | 9/1971 | Germany . | |
| 750826 | 6/1956 | United Kingdom . | |

OTHER PUBLICATIONS

*Machine Design*, "Expanding Bushing Eliminates Keyways," vol. 43, No. 11, p. 67 (29 Apr. 1971).

An article entitled "Product Update: Wobble–Free Bushings for Shaft–to–Shaft Mounting," *Design Engineering* magazine, p. 12 (Oct. 1994).

A promotional publication entitled "New Product Announcement: No Key and Wobble Free," *Stober News* (Oct. 1, 1994).

Link–Belt catalog No. 9010, pp. 2 and 19 (1993), Model FX Bushings.

Service Instruction Manual published by Leroy–Somer, Inc. of Palatine, Illinois, p. 6, Parts List Single/Double Reduction.

A publication of The American Pulley Company describing a product referred to as "The Shaft King," copyright date 1952.

(List continued on next page.)

*Primary Examiner*—Blair Johnson
*Assistant Examiner*—Andrea Chop
*Attorney, Agent, or Firm*—Craig N. Killen; John M. Miller; John J. Horn

[57] ABSTRACT

A shaft-carried speed reducer is provided having an adaptable mounting arrangement. The hub of the speed reducer is configured having a substantially cylindrical axial bore. At least one annular groove may be defined in the axial bore to receive a snap ring when desired. A removable adapter having a tapered interior surface may then be situated in the hub bore to abut the snap ring. As an alternative to such a snap ring, an annular flange may be provided on the removable adapter to engage an end face of the hub. A tapered sleeve member engages the tapered interior surface defined on the removable adapter to effect securement of the hub to the shaft. If a single adapter is used, it may be inserted from either side of the hub in some configurations. Further, some configurations permit a pair of adapters and corresponding sleeve members to be used. The adapter and snap ring, if any, may be removed when the hub is to be secured to a screw conveyor drive shaft or the like.

29 Claims, 9 Drawing Sheets

OTHER PUBLICATIONS

Renold Gears catalog No. 0692 1E, p. 4, Helical Gear Units.

SALA catalog, p. 16 (Dec. 1992), Speed Reducer.

J.H. Fenner & Co. catalog, p. 8, copyright date 1990, Taper Grip.

A publication from Dorris Mfg. of St. Louis, MO, dated Dec. 13, 1991, Dorris Tapered Bushing.

Foote–Jones/Illinois Gear catalog No. PT–212H/7181F/15M/12–90/Tr/AE, pp. 18–19 and 26, Tapered Bushing & Key Selection.

Browning catalog No. 11, pp. M–105 and M–106 (1991), Shaft Mount Reducers.

Dodge catalog No. DMR–291–1, published by Reliance Electric Co. of Greenville, SC, pp. G5–4 and G5–5, "Twin Tapered Bushings".

Bulletin 371–110, published by the Falk Corporation, pp. 2 and 3 (Dec. 1992), "Falk Drives".

Dodge catalog No. A–235–2, published by Reliance Electric Co. of Greenville, SC, p. G6–1, copyright date 1982, "Dodge Speed Reducers".

SHAFT-CARRIED SPEED REDUCER HAVING ADAPTABLE MOUNTING ARRANGEMENT

BACKGROUND OF THE INVENTION

The present invention relates generally to the art of speed reducers of the type including an output hub for mounting to a shaft to be driven. More particularly, the present invention relates to a mounting arrangement for such a speed reducer which is adaptable to a variety of shaft configurations.

In many applications, it is desirable to utilize a speed reducer which does not itself have an output shaft, but instead mounts to an existing shaft. For example, it will frequently be desirable to mount a speed reducer to a pulley shaft in a belt conveyor system. Typically, the shaft in this case may serve as the primary means by which the speed reducer is supported. An arm member may also be provided to resist torque which would otherwise tend to rotate the speed reducer housing about the output hub.

Various arrangements have been provided to secure the output hub of the speed reducer to the shaft. In a typical arrangement, the output hub includes one or more tapered surfaces on its interior. A sleeve member having a tapered exterior surface is moved into the hub to engage one of the tapered interior surfaces. The sleeve member includes a slot which allows contraction about the shaft when the complementary tapered surfaces are brought into engagement. Examples of such arrangements are shown in U.S. Pat. No. 4,626,114 to Phillips and U.S. Pat. No. 3,590,652 to Strang, each incorporated herein by reference.

Similar speed reducers are often utilized in applications involving a screw conveyor. A screw conveyor typically includes an elongated auger mounted within an appropriate trough. The auger is driven by a shaft secured to the output hub of the speed reducer. In this case, the speed reducer itself typically serves to support one end of the shaft and auger. The other end of the auger is generally supported by an appropriate bearing at the opposite end of the trough. A particulate material, such as grain or sand, is conveyed down the trough by rotation of the auger.

In a screw conveyor, the load imposed on the auger by the conveyed material will sometimes impart a significant axial force to the shaft. Because of the axial force imparted on the shaft, as well as the difficulty in machining a matching taper on the drive shaft, screw conveyor applications have typically not utilized tapered sleeve mounting arrangements such as that described above. Instead, a reduced diameter portion of the shaft is typically mounted in a straight hub such that a face of the hub abuts a shoulder defined on the shaft. A retaining plate is attached to the end of the shaft to abut the opposite face of the hub or a snap ring situated in a groove just inside of the end face of the hub. This arrangement "sandwiches" the hub to resist the axial force imparted on the shaft by the conveyor.

In most other respects, such as the drive train, speed reducers utilized for general applications such as belt conveyors and speed reducers utilized with screw conveyors are substantially similar. However, the different mounting arrangements discussed above have required the installation of different output hubs in the speed reducer, depending on the application.

Further, while prior art tapered sleeve mounting arrangements have been effective at securing the output hub to a shaft, they have not been as versatile as would often be desirable. For example, it would be desirable to provide a speed reducer in which the same hub could be used for applications requiring tapered sleeves as well as applications requiring attachment without tapered sleeves. An arrangement would also be desirable which permitted the optional use of one or two tapered sleeves. In addition, enhanced versatility would be provided by a single tapered sleeve that is mountable from either side of the speed reducer. It would also be desirable to provide an arrangement whereby the speed reducer may be secured to a shaft which does not extend completely through the output hub.

SUMMARY OF THE INVENTION

The present invention recognizes and addresses the foregoing disadvantages, and others, of prior art constructions and methods. Accordingly, it is an object of the present invention to provide an improved arrangement for securing a hub of a speed reducer to a shaft.

It is a further object of the present invention to provide an arrangement for securing a hub having a substantially cylindrical interior surface which is adaptable to applications requiring a tapered hub.

It is a more particular object of the present invention to provide a shaft mounting arrangement which may be utilized with either a shaft that supports the reducer, such as many belt conveyor shafts, or an arrangement in which the speed reducer supports one end of the shaft, as typified by the shaft of many screw conveyers.

It is a further object of the present invention to provide an improved tapered sleeve mounting arrangement for a speed reducer hub.

It is a further object of the present invention to provide a tapered sleeve mounting arrangement which may selectively utilize one or two tapered sleeve members.

It is a further object of the present invention to provide a tapered sleeve mounting arrangement which may utilize a single tapered sleeve member mountable on either side of the speed reducer.

It is a further object of the present invention to provide a tapered sleeve mounting arrangement which may be mounted to a shaft which does not extend completely through the hub.

It is also an object of the present invention to provide improved methods of securing an element having a substantially cylindrical axial bore to a shaft.

Some of these objects are achieved by a speed reducer apparatus adaptable to be mounted on either a straight shaft or a stepped shaft. The apparatus comprises a reducer housing from which an input shaft extends for connection to a source of mechanical power. An output hub of the speed reducer apparatus defines a substantially cylindrical axial bore for receipt of the shaft to be driven. The output hub itself is driven by rotation of the input shaft.

At least one removable adapter is provided having a substantially cylindrical outer surface and a tapered interior surface. An expansion slot is defined along the length of the adapter. The adapter is configured for insertion into the axial bore of the hub such that a lesser diameter end of the tapered interior surface will extend farther into the axial bore than a greater diameter end thereof. Further, at least one sleeve member is provided for receipt about the rotatable shaft. The sleeve member includes a flange portion at one end thereof and an exterior tapered portion defining an axial contraction slot.

Securement means are further provided for axially moving together the sleeve member and the removable adapter such that the tapered exterior surface and the tapered interior surface are brought into engagement. Retaining means maintain the removable adapter in position as the sleeve member and removable adapter are moved together by the securement means. As a result, the adapter, and hence the hub, will be secured to the shaft.

In an exemplary construction, the securement means includes a plurality of spaced apart and axial through-bores defined in the flange portion of the sleeve member. In this case, a backing ring may be mounted on the hub to define therein a plurality of threaded holes in substantial register with the through-bores. A plurality of threaded members extend through the through-bores of the sleeve member and engage the threaded holes.

The retaining means may preferably include one or more annular grooves defined in the axial bore of the hub. In this case, a removable ring member may be situated in a selected one of the annular grooves to abut the removable adapter. In some embodiments, it will be desirable to locate one of the annular grooves at approximately an axial midpoint of the axial bore defined in the hub. In other embodiments, pairs of grooves may be provided with individual grooves of each pair defined at symmetrical locations as seen from the axial midpoint.

As an alternative, the retaining means may comprise an annular flange located on the removable adapter at the greater inner diameter end thereof. In this case, the annular flange may engage an end face of the hub as the sleeve member and the removable adapter are moved together. The removable adapter will thereby be retained from undesired axial movement in the axial bore.

In some applications, it may be desirable to provide a single removable adapter and a single sleeve member. If the shaft to be secured extends completely through the hub, the single sleeve member may be mounted on a side of the speed reducer opposite to the application equipment, such as the conveyor. If the rotatable shaft extends only partially through the hub, the single sleeve member may be mounted on the inner side of the speed reducer. In other applications, it may be desirable to utilize a pair of removable adapters with oppositely directed tapered sleeve members.

Other objects of the invention are achieved by a method of securing an element having a substantially cylindrical axial bore to a shaft. The method comprises the step of providing an annular groove in the axial bore at a selected location. As an additional step, an annular ring member is placed in the groove. The ring member should be of the type having an inner diameter less than an inner diameter of axial bore to thereby provide an abutment portion. An additional step of the method involves inserting into the axial bore a removable adapter having a tapered interior surface, such that a lesser inner diameter end thereof is juxtaposed to the abutment portion of the ring member. In this case, a greater inner diameter end of the adapter will be axially closer to an end of the axial bore from which the adapter has been inserted. Next, a sleeve member is placed about the rotatable shaft such that a tapered exterior surface thereof is generally complementary to the tapered interior surface of the removable adapter. The sleeve member and the removable adapter are then moved axially together such that the exterior tapered surface will engage the interior tapered surface.

Another method of the present invention includes the step of providing a removable adapter having a generally cylindrical outer surface and a tapered interior surface, the removable adapter further having an annular flange at a greater inner diameter end thereof. The removable adapter is inserted into the axial bore such that the greater inner diameter end abuts the element at a location adjacent an end of the axial bore. A further step of the method involves placing a sleeve member as described above about the rotatable shaft and moving it into engagement with the tapered interior surface of the removable adapter.

Other objects, features and aspects of the present invention are provided by various combinations and subcombinations of the disclosed elements and methods, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Figure 1:
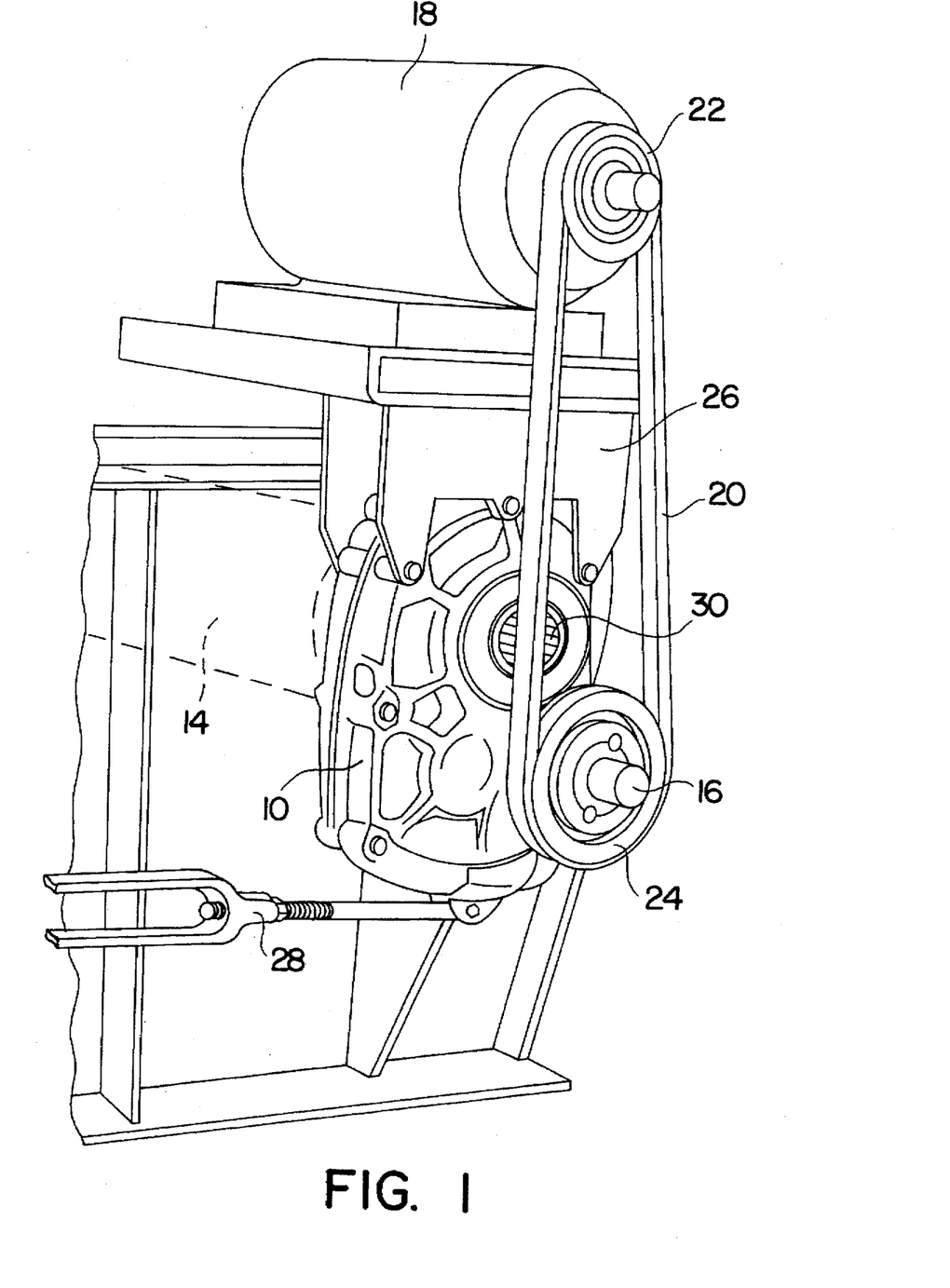
FIG. 1 is a perspective view illustrating a speed reducer apparatus driving a pulley shaft of a belt conveyor.

Referring now to FIG. 1, a shaft-carried speed reducer 10 is illustrated in a typical application in which such devices are utilized. As is well known, speed reducers function generally to reduce the rotational speed of mechanical power received from a power source. Such reduction in rotational speed causes a concomitant increase in torque delivered to the load, as desired.

In this case, speed reducer 10 is shown driving a shaft 12 (FIG. 2) extending from a pulley 14 of a belt conveyor apparatus. Speed reducer 10 includes an input shaft 16 driven by a prime mover, here electric motor 18. Electric motor 18 is connected to input shaft 16 through a V-belt 20 extending about respective sheaves 22 and 24.

Often, substantially the entire weight of speed reducer 10 and associated equipment will be supported by the shaft on which it is secured. For example, in the illustrated embodiment, a bracket 26 is provided attached to speed reducer 10 to support electric motor 18. Thus, the weight of both speed reducer 10 and motor 18 is supported by shaft 12. An arm member 28 is provided to resist torque which would otherwise tend to rotate speed reducer 10 about shaft 12.

Figure 2:
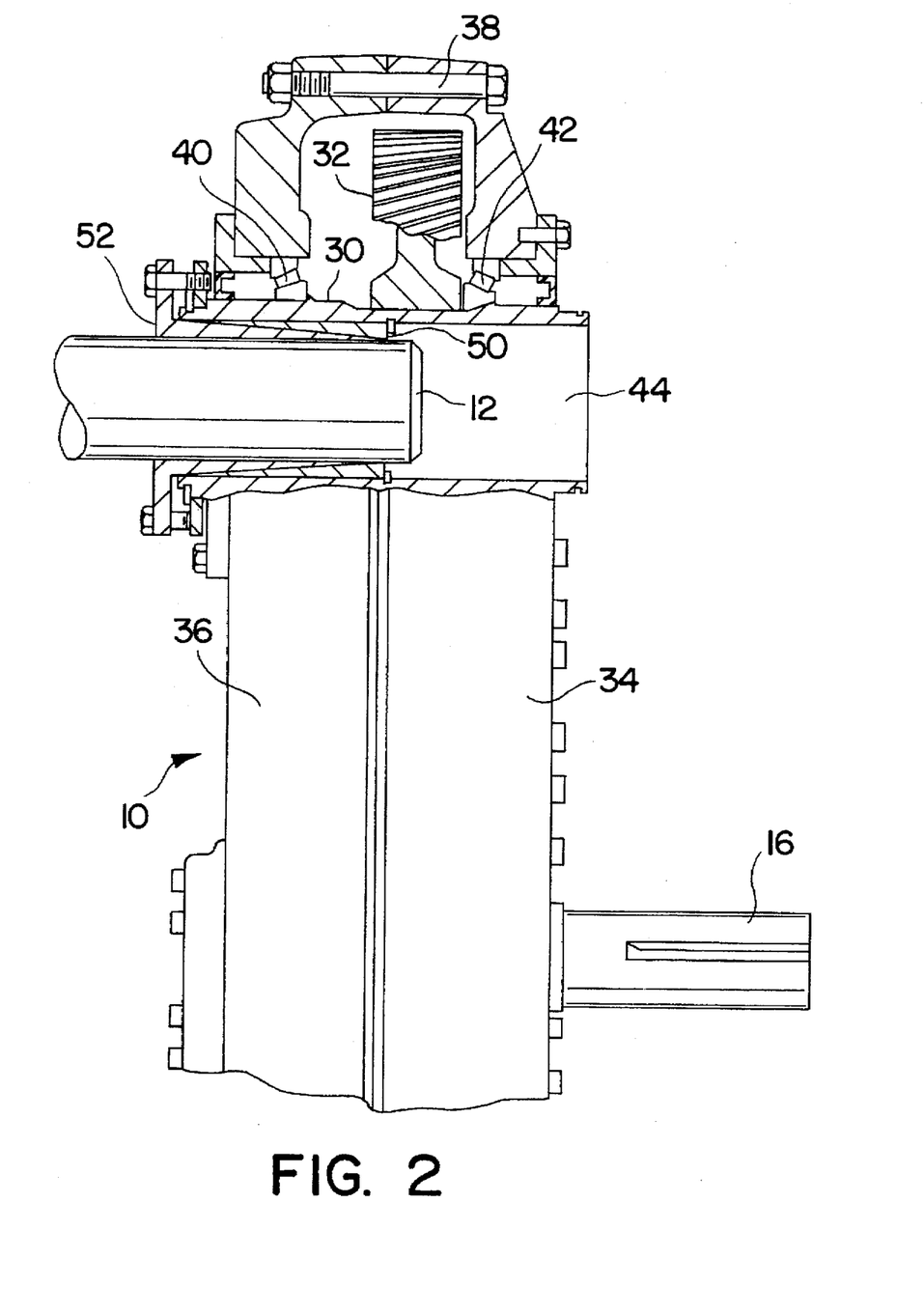
FIG. 2 is a side elevation of a speed reducer apparatus in partial cross section illustrating one manner of shaft securement according to the present invention.

As can be seen in FIG. 2, shaft 12 is itself secured to output hub 30 of speed reducer 10, which is secured to output gear 32. Output gear 32 is, in turn, driven from input shaft 16 by an appropriate gear train within the housing of speed reducer 10. As shown, the housing may be constructed having a front section 34 and a back section 36 mated together utilizing bolts, such as bolt 38. Hub 30 is rotatably supported in the reducer housing by suitable bearing assemblies, such as those indicated at 40 and 42.

Figure 3:
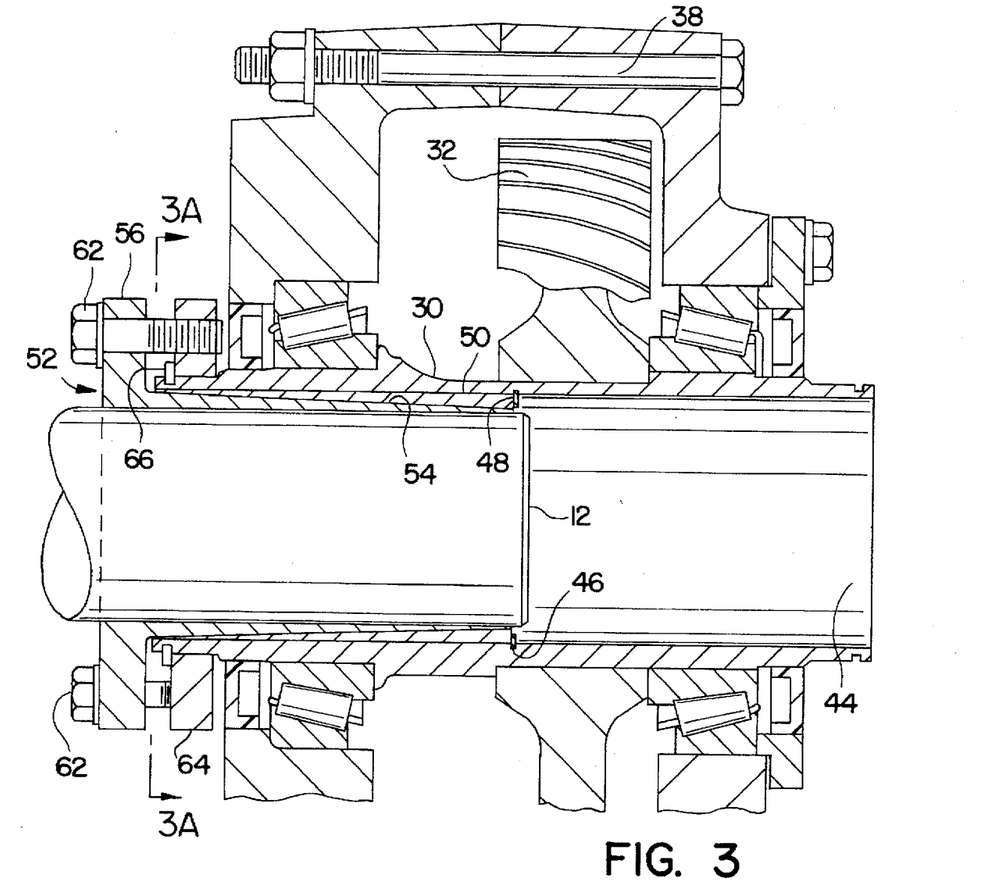
FIG. 3 is an enlarged view in partial cross section illustrating shaft securement as in FIG. 2.

Referring now to FIG. 3, the manner in which hub 30 is secured to shaft 12 may be most easily seen. As shown, hub 30 defines an axial bore having a substantially cylindrical interior surface 44. In the illustrated embodiment, an annular groove 46 is defined in interior surface 44 at a location substantially at the midpoint of the axial bore. A removable snap ring 48 is situated in groove 46 such that a portion thereof extends radially inward of interior surface 44.

A removable adapter 50 having a substantially cylindrical outer surface and tapered interior surface is situated in the axial bore of hub 30 as shown. Specifically, the greater inner diameter portion of adapter 50 is adjacent one end of the axial bore, whereas the lesser inner diameter end thereof abuts the portion of snap ring 48 extending radially inward of interior surface 44.

In addition, a sleeve member 52 having a tapered portion 54 and a flange portion 56 is received about shaft 12. As shown, tapered portion 54 has a substantially cylindrical interior surface and a tapered exterior surface. The tapered exterior surface of tapered portion 54 is substantially complementary to the tapered interior surface of adapter 50.

Figure 3A:
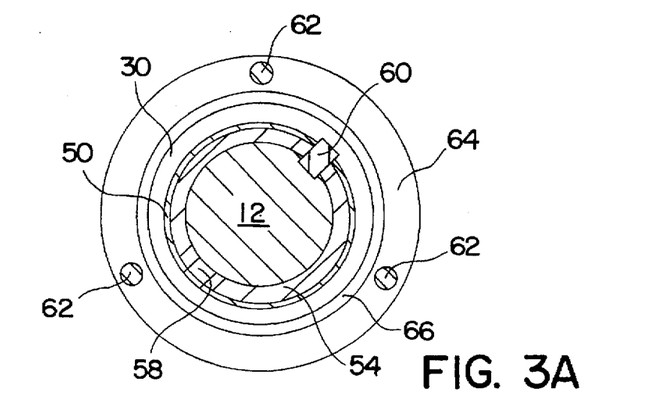
FIG. 3A is a cross sectional view as taken along line 3A—3A of FIG. 3.

As can be seen in FIG. 3A, a contraction slot 58 is defined in sleeve member 52 at least throughout the axial length of tapered portion 54. Thus, as the tapered exterior surface of tapered portion 54 is drawn into engagement with the tapered interior surface of adapter 50, sleeve member 52 will contract about shaft 12. In addition, a similar expansion slot is defined in adapter 50, preferably throughout its entire axial length. This expansion slot permits adapter 50 to expand as sleeve member 52 is moved therein to firmly contact interior surface 44.

FIG. 3A also illustrates key 60, which may be provided to prevent rotational slippage between shaft 12 and hub 30. As shown, key 60 is situated in appropriate keyways defined in shaft 12, adapter 50, tapered portion 54 and hub 30.

Referring again to FIG. 3, securement means are provided to cause sleeve member 52 to be drawn into adapter 50 in the manner described. In exemplary constructions, such securement means may include a plurality of tightening bolts 62 extending through axial through-bores defined in flange portion 56. Bolts 62 engage threaded holes defined in a backing plate 64 which is mounted to hub 30.

To remove sleeve member 52, bolts 62 may be withdrawn from the through bores and inserted into threaded holes also located in flange portion 56. Typically, these threaded holes will be angularly spaced and respectively located equidistant between two of the through-bores. Tightening of bolts 62 will cause them to press against the surface of backing plate 64 with increasing force. As a result, sleeve member 52 will be forced out of engagement with adapter 50.

Preferably, backing plate 64 may be a separate element from hub 30. In this case, backing plate 64 may be retained by one or more snap rings, such as snap ring 66, situated in annular grooves defined on the exterior surface of hub 30. This construction allows backing plate 64 to be rotated during assembly such that the threaded holes defined therein may be brought into substantial register with the through-bores of flange portion 56. It should be appreciated, however, that embodiments could be constructed in which the threaded holes are defined in the end face of hub 30 itself.

As can be seen, the length of shaft 12 is relatively short. Due to its short length, shaft 12 terminates in the interior of hub 30 instead of extending completely therethrough. A prior art construction requiring that the shaft extend completely through the hub could therefore not be used in this situation.

Figure 4:
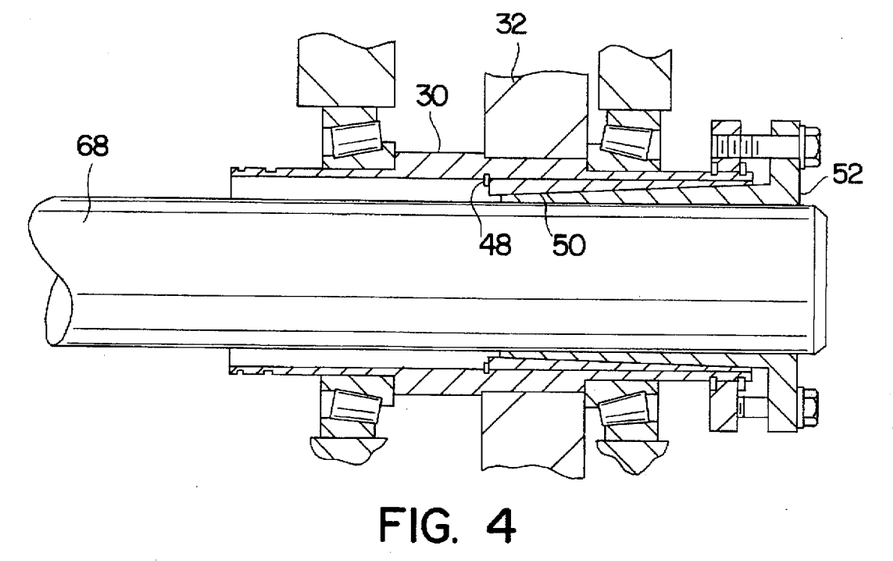
FIG. 4 is an enlarged partial cross sectional view illustrating a first alternative shaft securement technique according to the present invention.

Referring now to FIG. 4, an alternative mounting configuration is illustrated. In this case, a shaft 68 is provided having a sufficient length to extend through hub 30. As a result, adapter 50 may be inserted into the opposite end of hub 30 from that shown in FIG. 3. In this manner, sleeve member 52 can be conveniently installed from the side of speed reducer 10 which is opposite to the conveyor or other application equipment. This eliminates the need for the installer to attempt installation from behind speed reducer 10 which, it will be appreciated, is often difficult in the field.

Figure 5:
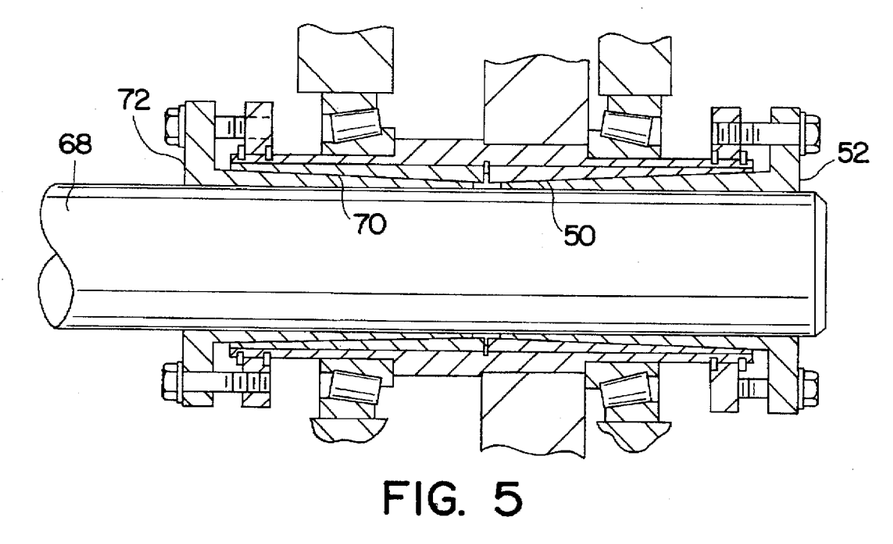
FIG. 5 is an enlarged partial cross sectional view illustrating a second alternative shaft securement technique according to the present invention.

It can thus be seen that the illustrated construction allows sleeve member 52 to be installed from either side of speed reducer 10. In some situations, it may be desirable to provide the additional clamping force, or additional stability, which may be achieved using two sleeve members. Thus, FIG. 5 illustrates an application in which an auxiliary adapter 70 and an auxiliary sleeve member 72 are also provided.

Figure 6:
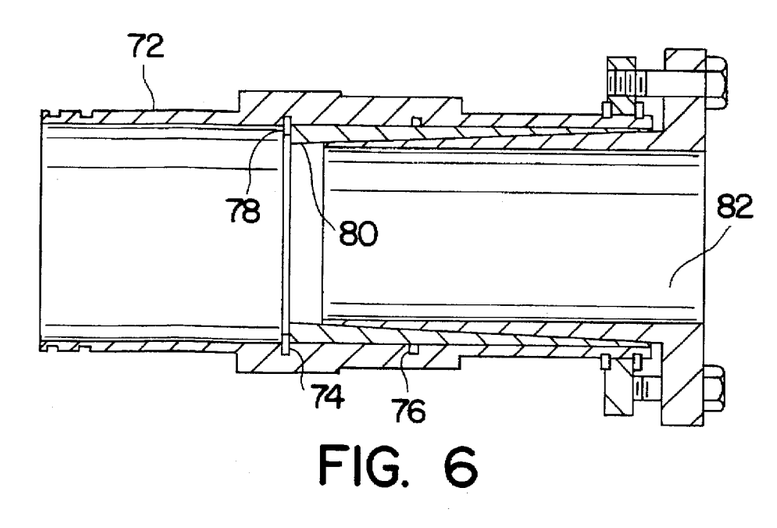
FIG. 6 is an enlarged cross sectional view illustrating a third alternative shaft securement technique according to the present invention.

While hub 30 includes a single annular groove 46 located at the axial midpoint of the bore, it should be understood that other configurations may also be desirable. For example, FIG. 6 illustrates a hub 72 defining therein a pair of annular grooves 74 and 76. A snap ring 78 is located in groove 74 as shown. Groove 76 is unused in this case because adapter 80 has a length greater than one-half the axial length of the bore defined by hub 72. A sleeve member 82 of similar length is provided to engage adapter 80. It will be appreciated that adapter 80 and sleeve member 82 could be inserted into the opposite end of the bore if snap ring 78 were to be placed in groove 76.

Figure 7:
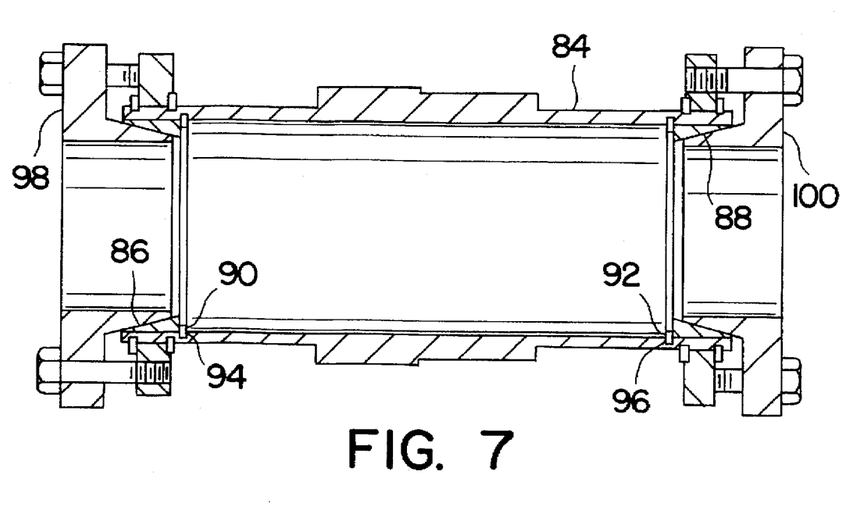
FIG. 7 is an enlarged cross sectional view illustrating a fourth alternative shaft securement technique according to the present invention.

The present invention also contemplates the use of shorter length adapters in applications where such is desirable. For example, FIG. 7 illustrates a hub 84 having a pair of shorter length adapters 86 and 88 abutting respective snap rings 90 and 92. Snap rings 90 and 92 are, in turn, located in respective annular grooves 94 and 96 defined in hub 84. The tapered exterior surfaces of adapters 86 and 88 are engaged by respective sleeve members 98 and 100.

Figure 7A:
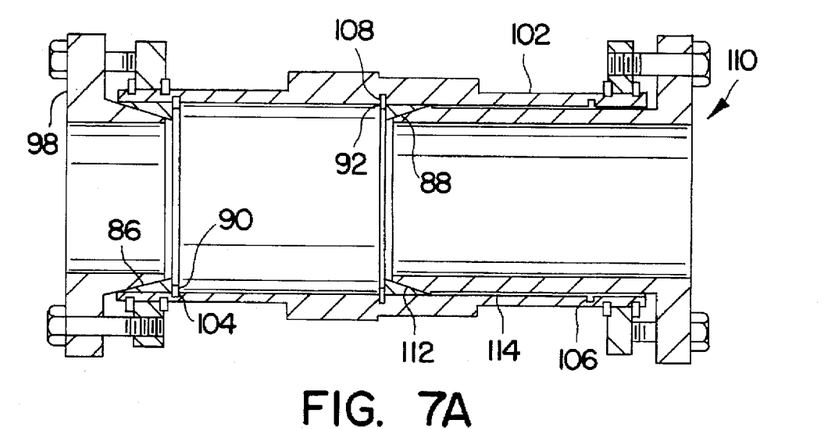
FIG. 7A is an enlarged cross sectional view similar to FIG. 7 illustrating a still further alternative shaft, securement technique according to the present invention.

It will be appreciated that the arrangement shown in FIG. 7 would require a shaft, such as shaft 68 discussed above, which extends completely through the axial bore. For shorter length shafts, such as shaft 12, an alternative arrangement as shown in FIG. 7A may be utilized. In this case, a hub 102 is illustrated defining grooves 104 and 106 which correspond to grooves 94 and 96 of hub 84. Unlike hub 84, hub 102 further includes a centrally located groove 108 similar to groove 46 of hub 30. As can be seen, groove 106 is not utilized in this case. Instead, snap ring 92 is situated in groove 108. Adapter member 88 is pushed farther into the axial bore to abut snap ring 92 as shown.

In this case, a sleeve member 110 is provided having a tapered portion 112 and a relatively elongated cylindrical portion 114. Cylindrical portion 114 has an outer diameter slightly less than the inner diameter of hub 102 to permit sleeve member 110 to be easily inserted therein. The tapered outer surface of tapered portion 112 engages the tapered inner surface of adapter 88 in the manner described above.

It will be appreciated that adapter 88 and sleeve member 110 could be replaced by an arrangement having a more gradual taper, such as adapter 50 in sleeve member 52 as discussed above in FIGS. 2–5. However, it is often desirable to utilize arrangements having a greater taper when attachment is to be effected from both sides. This is because arrangements having a greater taper may be more easily removed. Arrangements having a more gradual taper may often permanently adhere to the shaft and adapter, causing the bolts or the like used for removal to break the flange portion away from the tapered portion of the sleeve member.

Figure 8:
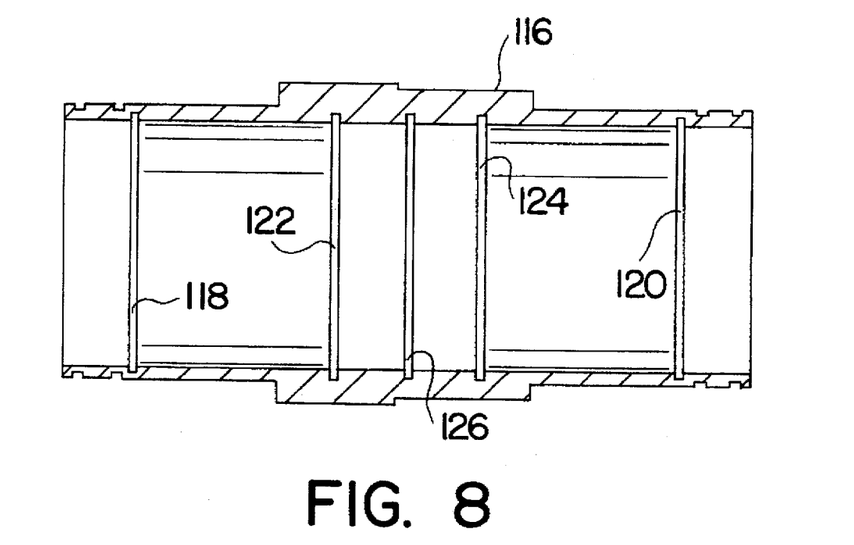
FIG. 8 is an enlarged cross sectional view of a hub member showing a plurality of annular grooves therein for receipt of respective annular rings.

FIG. 8 illustrates a hub 116 having a total of five annular grooves defined therein. The outermost grooves, indicated at 118 and 120, respectively correspond to grooves 94 and 96 of hub 84. Grooves 122 and 124 respectively correspond to grooves 74 and 76 of hub 72. Groove 126, located at approximately the axial midpoint of the hub bore, corresponds to groove 46 of hub 30. It can thus be seen that hub 116 would be suitable for use in any of the embodiments illustrated in FIGS. 2 through 7A. As such, this configuration provides a significant degree of versatility in use.

Figure 9:
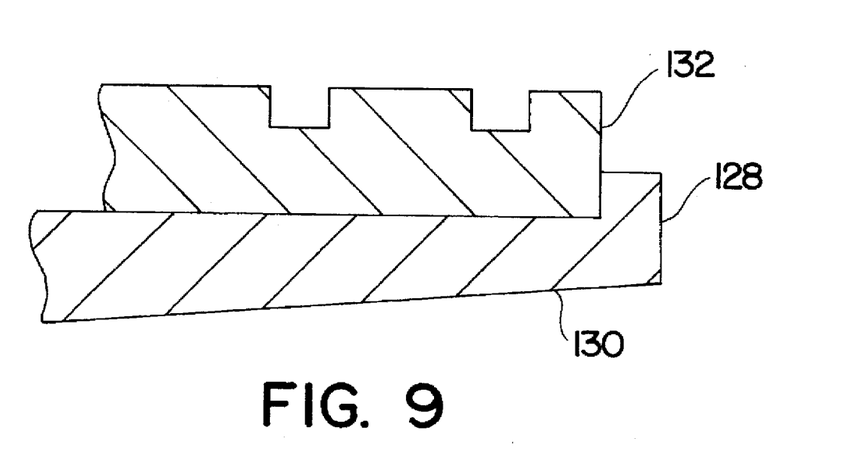
FIG. 9 is an enlarged cross sectional view illustrating alternative retaining means according to the present invention.

While the above configurations each utilize a snap ring to retain the removable adapter during securement, it should be appreciated that other suitable retaining means may also be utilized. For example, FIG. 9 illustrates a modification of the removable adapter which effectively performs this retaining function. Specifically, an annular flange 128 is located at the greater inner diameter end 130 of a removable adapter. As the removable adapter and sleeve member are moved together, flange 128 engages an end face 132 of the hub member. As a result, the adapter will be prevented from undesired axial movement.

Figure 10:
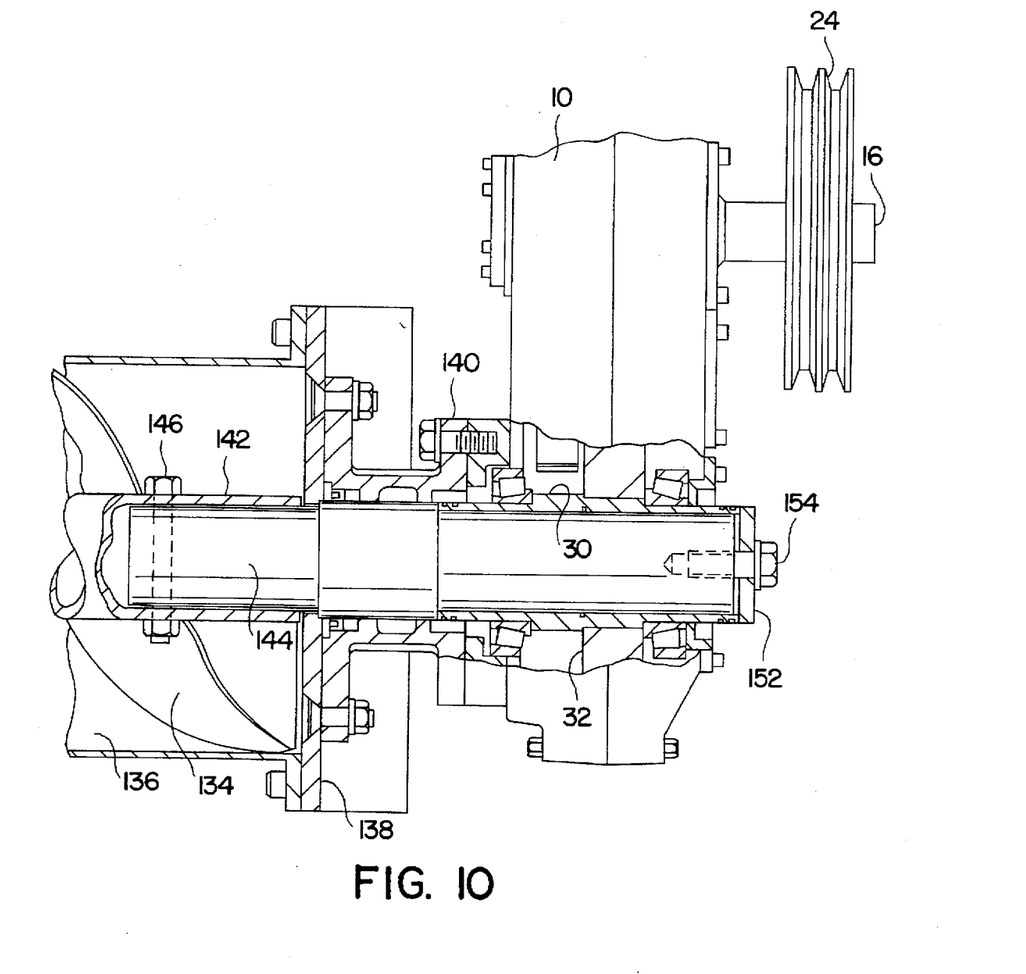
FIG. 10 is a side elevation of a speed reducer apparatus in partial cross section illustrating attachment to a screw conveyor shaft.

Referring now to FIG. 10, speed reducer 10 is shown installed in an application utilizing a screw conveyor. As can be seen, the screw conveyor includes a rotatable auger 134 situated within a trough 136. Trough 136 includes an end plate 138 having a mounting bracket 140 attached thereto. The housing of speed reducer 10 is attached to mounting bracket 140, as shown.

Auger 134 includes a tubular portion 142 to which a drive shaft 144 is connected. Specifically, drive shaft 144 partially extends into tubular portion 142 and is retained by one or more (generally two) transverse through-bolts such as bolt 146. Thus, as shaft 144 is driven, auger 134 will be rotated to move the particulate material located in trough 136.

Figure 11:
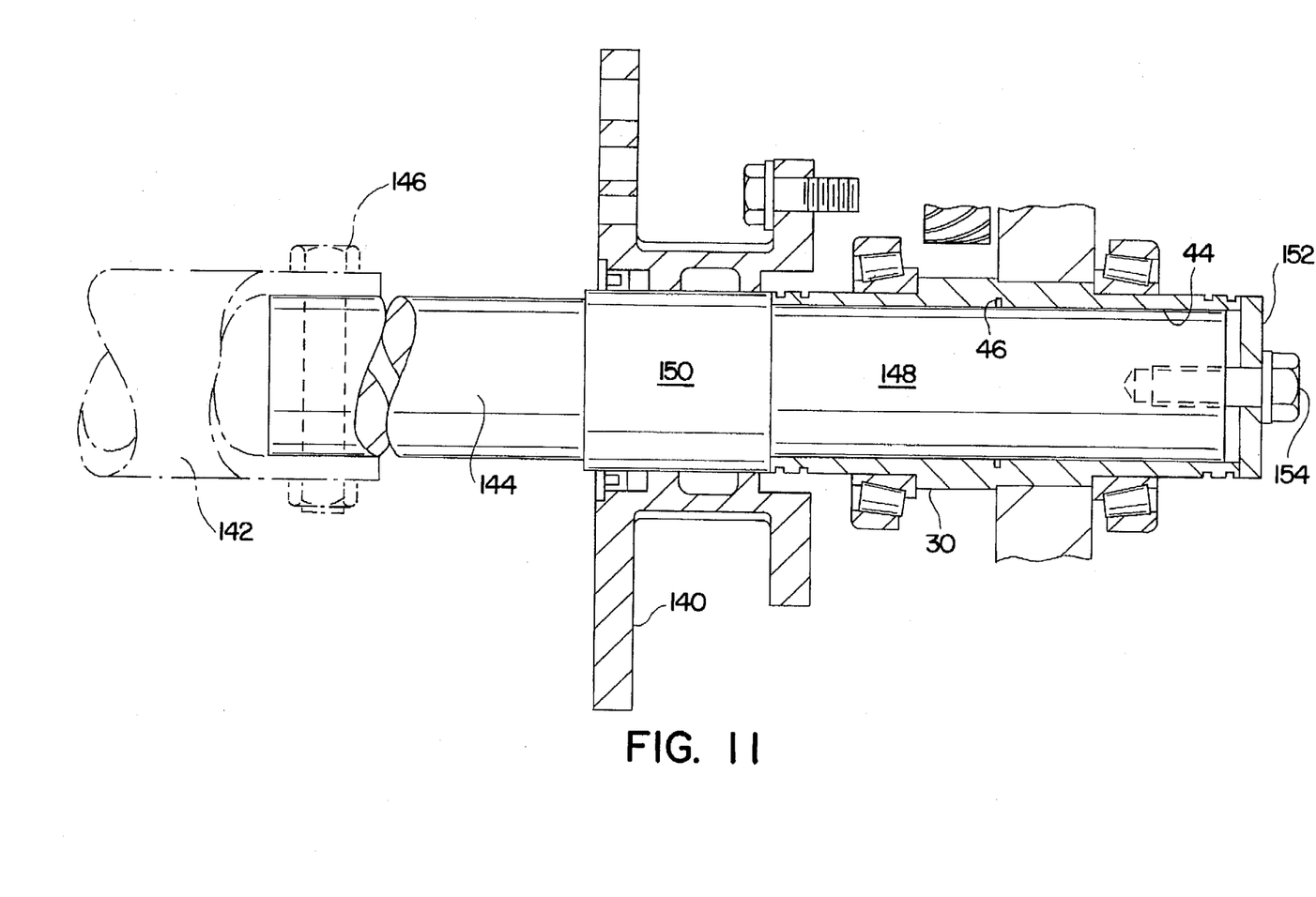
FIG. 11 is an enlarged view in partial cross section illustrating shaft securement as in FIG. 10.

As can be most easily seen in FIG. 11, a removable adapter is not utilized in this case to achieve securement of hub 30 to shaft 144. In addition, the snap ring 48 has been removed from the annular groove 46. Instead, a reduced diameter portion 148 of shaft 144 is directly inserted into the cylindrical interior surface 44 of hub 30, as shown.

To "sandwich" hub 30, shaft 144 further includes a stepped portion 150 engaging a first outer face of hub 30. The opposite outer face of hub 30 is engaged by a retaining plate 152 attached to the end of portion 148. Preferably, retaining plate 152 is attached to portion 148 utilizing a bolt 154 threadingly engaging a suitable hole which has been tapped therein.

Figure 11A:
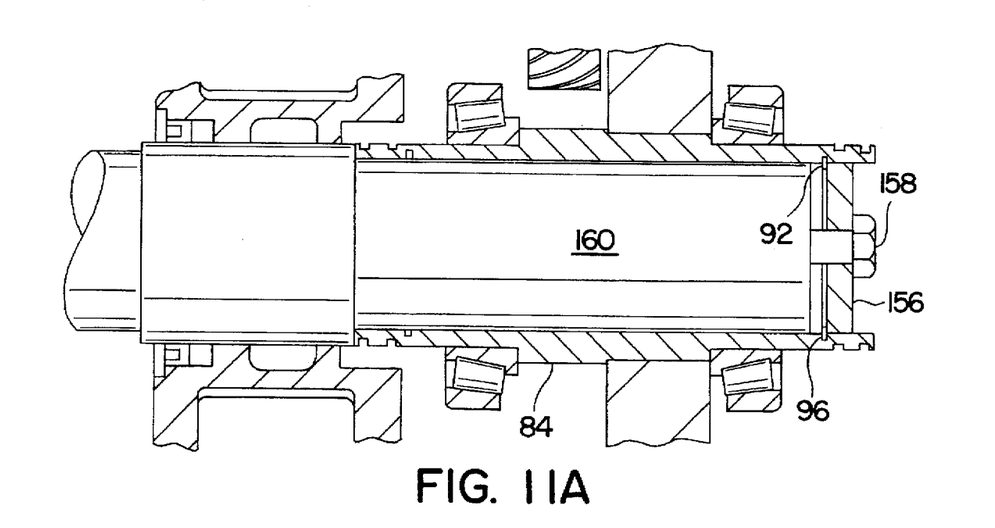
FIG. 11A is an enlarged view in partial cross section illustrating an alternative to shaft securement as shown in FIG. 11.

FIG. 11A illustrates an alternative arrangement utilizing hub 84 of FIG. 7. As can be seen, snap ring 92 remains in groove 96 in this case. An end plate 156 having a diameter slightly less than the inner diameter of hub 84 is inserted therein to abut snap ring 92. A bolt 158 threadingly engages a suitable hole tapped into the end of a reduced diameter portion 160 of the auger drive shaft. It should be appreciated that reduced diameter portion 160 may often have a shorter length than would otherwise be the case because end plate 156 is located partially inside of the hub bore.

It can thus be seen that the illustrated construction is adaptable to use either tapered sleeve securement or "sandwiched" securement, depending on the requirements of a particular application. While preferred embodiments of the invention have been shown and described, modifications and variations may be made thereto by those of ordinary skill in the art without departing from the spirit and scope of the present invention, which is more particularly set forth in the appended claims. In addition, it should be understood that aspects of the various exemplary constructions may be interchanged both in whole or in part. Furthermore, those of ordinary skill in the art will appreciate that the foregoing is by way of example only, and is not intended to be limitative of the invention so further described in such appended claims.

What is claimed is:

1. A speed reducer apparatus adaptable to be mounted on a first shaft, said apparatus comprising:

a housing;

a second shaft extending from said housing for connection to a source of power;

an output hub defining a substantially cylindrical axial bore in which said first shaft is received, said hub being driven by rotation of said second shaft;

at least one removable and generally cylindrical adapter having a tapered surface, an axially extended wall surface, an enlarged thickness end surface substantially perpendicular to said wall surface and an axial adapter slot, said adapter being disposed within said bore;

at least one sleeve member for receipt about said first shaft, said sleeve member having a flange portion at one end thereof and a tapered portion defining an axial sleeve slot;

means for compressing said sleeve member and said removable adapter such that said tapered portion of said sleeve member will engage said tapered surface of said removable adapter to effect securement of said hub to said first shaft; and means, removably disposed within said bore, for contacting said enlarged thickness end surface of said adapter and for maintaining said removable adapter in a predetermined position as said sleeve member and said removable adapter are compressed by said means for compressing.

2. A speed reducer as in claim 1, wherein said means for contacting and for maintaining includes at least one annular groove defined in said axial bore and a removable ring member adapted to be situated in said groove, said ring member abutting said enlarged thickness end surface of said removable adapter.

3. A speed reducer as in claim 2, wherein said annular groove is located at approximately an axial midpoint of said axial bore.

4. A speed reducer as in claim 2, wherein said at least one annular groove includes a plurality of annular grooves defined at predetermined locations in said axial bore.

5. A speed reducer as in claim 4, wherein said plurality of annular grooves comprises at least three annular grooves.

6. A speed reducer as in claim 2, wherein said tapered surface of said removable adapter tapers uniformly from an end of reduced thickness to said enlarged thickness end surface thereof.

7. A speed reducer as in claim 1, wherein said means for compressing comprises:
a plurality of spaced apart and axial bores defined in said flange portion of said sleeve member;
a backing ring mounted on said hub, said backing ring defining therein a plurality of threaded holes in substantial register with said axial bores of said sleeve member; and
a plurality of threaded members carried by said bores of said sleeve member and engaging said threaded holes of said backing ring.

8. A speed reducer as in claim 1, wherein said at least one removable adapter and said at least one sleeve member respectively comprise two removable adapters and two sleeve members mountable in pairs into opposite ends of said axial bore.

9. A speed reducer as in claim 8, wherein at least one of said sleeve members is constructed having an elongated cylindrical portion between said flange portion and said tapered portion.

10. A speed reducer as in claim 1, wherein said first shaft extends completely through said axial bore and terminates at a terminus location axially external of said hub, said sleeve member being mounted such that said tapered portion extends into said axial bore in a direction away from said terminus location.

11. A speed reducer as in claim 1, wherein said first shaft extends partially through said axial bore and terminates at a terminus location axially internal of said hub, said sleeve member being mounted such that said tapered portion extends into said axial bore in a direction toward said terminus location.

12. A speed reducer as in claim 1, wherein said at least one removable adapter and said at least one sleeve member respectively comprise a single removable adapter and a single sleeve member.

13. An adaptable arrangement for securing an element including a hub defining a substantially cylindrical axial bore to a shaft for rotation therewith, said arrangement comprising:
at least one removable adapter having a substantially cylindrical axially extending outer surface and a tapered interior surface and defining an axial expansion slot, said adapter configured for insertion into said axial bore of said hub such that a lesser inner diameter end thereof, having an end surface substantially perpendicular to said outer surface, will be inserted farther therein than a greater inner diameter end thereof;
at least one sleeve member for receipt about said rotatable shaft, said sleeve member having a flange portion at one end thereof and an exterior tapered portion defining an axial contraction slot;
means for compressing said sleeve member and said removable adapter such that said exterior tapered portion of said sleeve member will engage said interior tapered surface of said removable adapter to effect securement of said element to said shaft; and
means, removably disposed in said bore, for contacting said greater inner diameter end surface of said adapter and for maintaining said adapter in a predetermined position as said sleeve member and said removable adapter are compressed by said means for compressing.

14. An arrangement as in claim 13 wherein said means for contacting and maintaining includes at least one annular groove defined in said axial bore and a removable ring member adapted to be situated in said groove, said ring member abutting said removable adapter.

15. An arrangement as in claim 14, wherein said at least one annular groove includes a plurality of annular grooves defined at predetermined locations in said axial bore.

16. An arrangement as in claim 15, wherein said plurality of annular grooves comprises at least three annular grooves.

17. An arrangement as in claim 16, wherein a first groove of said at least three annular grooves is located approximately at an axial midpoint of said axial bore with an equal number of other annular grooves being located on respective opposite sides of said first groove.

18. An arrangement as in claim 16, wherein said plurality of annular grooves comprises at least five annular grooves.

19. An arrangement as in claim 14, wherein said removable adapter and said tapered portion of said sleeve member each have an axial length greater than one-half an axial length of said axial bore.

20. An arrangement as in claim 14, wherein said at least one removable adapter and said at least one sleeve member respectively comprise two removable adapters and two sleeve members mountable in pairs into opposite ends of said axial bore.

21. An arrangement as in claim 13, wherein at least one of said sleeve member is constructed having an elongated cylindrical portion between said flange portion and said tapered portion.

22. An arrangement as in claim 13, wherein said shaft extends completely through said axial bore and terminates at a terminus location axially external of said hub, said sleeve member being mounted such that said tapered portion extends into said axial bore in a direction away from said terminus location.

23. An arrangement as in claim 13, wherein said shaft extends partially through said axial bore and terminates at a terminus location axially internal of said hub, said sleeve member being mounted such that said tapered portion extends into said axial bore in a direction toward said terminus location.

24. An arrangement as in claim 13, wherein said tapered interior surface of said removable adapter tapers uniformly between said ends thereof.

25. An arrangement as in claim 13, wherein said means for compressing comprises:
a plurality of spaced apart and axial bores defined in said flange portion of said sleeve member;
a backing ring mounted on said hub, said backing ring defining therein a plurality of threaded holes in substantial register with said axial bores of said sleeve member; and a plurality of threaded members carried by said bores of said sleeve member and engaging said threaded holes of said backing ring.

26. An arrangement as in claim 13, wherein said shaft and said hub include keyways and a key therefor.

27. An arrangement as in claim 13, wherein said at least one removable adapter and said at least one sleeve member respectively comprise a single removable adapter and a single sleeve member.

28. An arrangement as in claim 13, wherein said at least one removable adapter and said at least one sleeve member respectively comprise two removable adapters and two sleeve members mountable in pairs into opposite ends of said axial bore.

29. An arrangement as in claim 28, wherein said removable adapters are abutted against a ring member located at approximately an axial midpoint of said axial bore.

* * * * *